United States Patent [19]
Wirefelt

[11] 3,855,680
[45] Dec. 24, 1974

[54] MILLING CUTTER

[75] Inventor: Sven Axel Olof Wirefelt, Sandviken, Sweden

[73] Assignee: Sandvik Aktiebolag, (formerly k/a Sandvikens Jernverks Aktiebolag), Sandviken, Sweden

[22] Filed: May 18, 1973

[21] Appl. No.: 361,649

[30] Foreign Application Priority Data
May 26, 1972 Sweden.............................. 6996/72

[52] U.S. Cl.............................................. 29/105 A
[51] Int. Cl.............................................. B26d 1/12
[58] Field of Search....................... 29/105 R, 105 A

[56] References Cited
UNITED STATES PATENTS
| | | | |
|---|---|---|---|
| 1,410,350 | 3/1922 | Smith et al......................... | 29/105 A |
| 2,930,111 | 3/1960 | St. Clair............................ | 29/105 A |
| 3,091,138 | 5/1963 | Berry................................. | 29/105 A |

Primary Examiner—Leonidas Vlachos
Attorney, Agent, or Firm—Pierce, Scheffler & Parker

[57] ABSTRACT

According to this invention, a relatively massive supporting body is secured to the spindle nose or rotary axle of a face milling machine, which suporting body serves as support for a disc-shaped milling cutter body bearing cutting inserts about its periphery.

2 Claims, 5 Drawing Figures

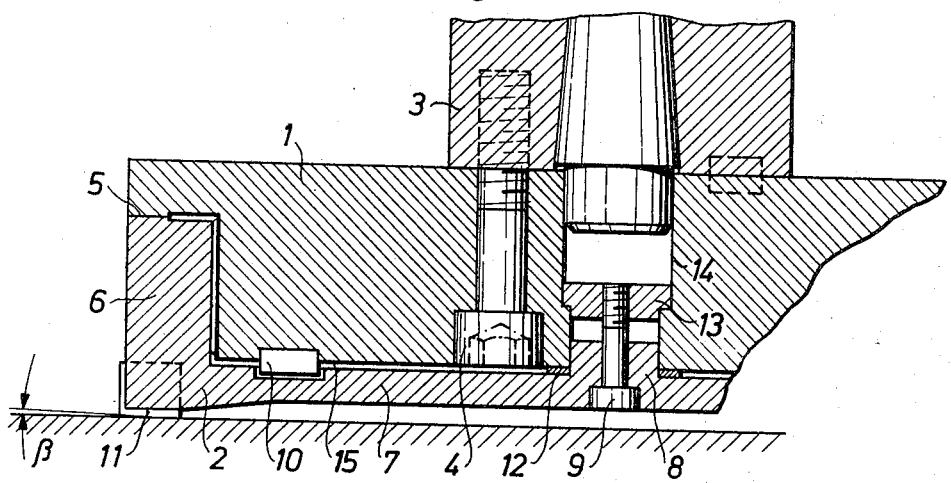
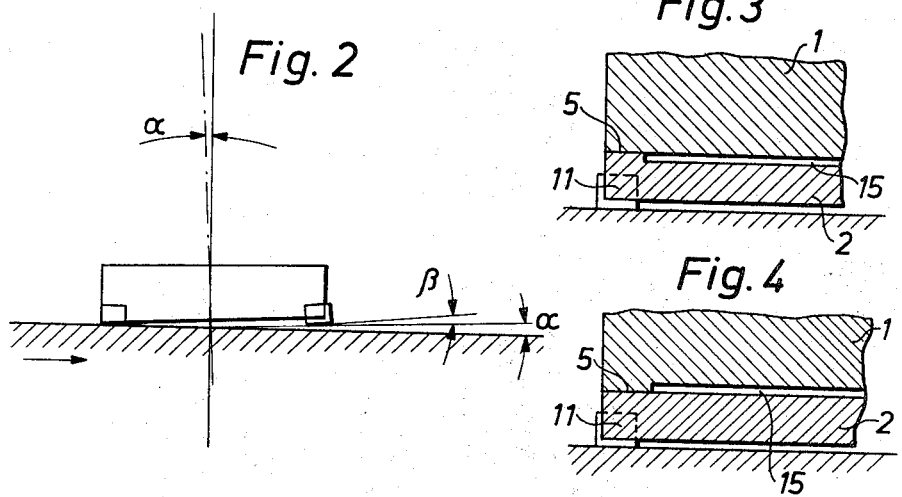
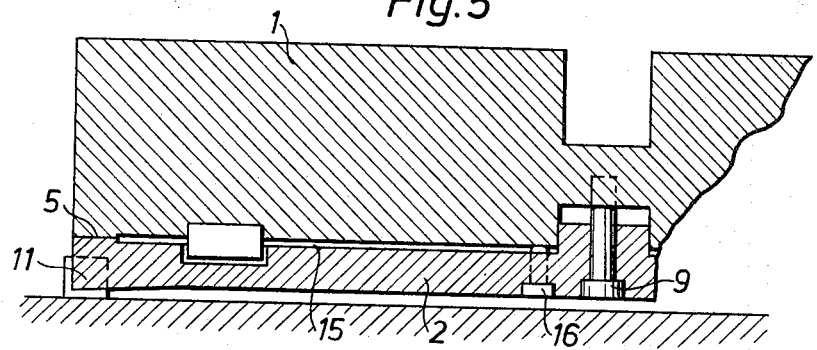

MILLING CUTTER

The present invention relates to a milling cutter and, in particular, to means for mounting and setting face mill cutters.

Milling is generally used when cutting plain surfaces of for example steel and cast iron bodies. The most common method is so-called face milling, which is characterized in that the rotary axle of the mill is perpendicular to the surface being machined. Furthermore, the work piece is moved, in relation to the milling cutter, perpendicularly to the rotary axle of the latter, so that the cutting edges on the periphery of the tool will engage and cut the material. The milling cutter is usually mounted with its plain back face against a plane upon the spindle nose of the milling machine. In order to obtain good stability of the tool and a large mass and thus a more uniform running, the milling cutter body usually has a considerable thickness and is fastened to the spindle nose by several heavy screws or equivalent fastening means.

The above-mentioned method of designing and fastening face mill cutters — which hitherto has been used fairly invariably — is marked by serious disadvantages. To obtain a good surface on the work piece it has been necessary that the milling cutter body rotates with small axial changes, i.e., that all cutting insert points rotate almost in the same plane perpendicular to the rotary axle. This makes great demands upon the precision of the contact surfaces of both the spindle nose and of the milling cutter body. The difficulties naturally increase with growing diameter of the cutter body, because the distance or overhang from the outer diameter of the spindle nose to the outer diameter of the milling cutter increases. The weight of the cutter and the necessity of using several screws for fastening it make the mounting and dismounting of the cutter — (which is usually required when changing inserts) — time-consuming. According to this invention, a relatively massive supporting body is secured to the spindle nose or rotary axle of a face milling machine, which supporting body serves as support for a disc-shaped milling cutter body bearing cutting inserts about its periphery.

Another, — hitherto unsolved, — problem arises in finishing with large plain faces upon the inserts. In order to reduce the influence of the scattering of the inserts in axial direction, the inserts are sometimes supplied with so wide plain faces that only a small number of inserts, which are made to protrude considerably, take part in generating the milled surface of the work piece. The adjustment of inserts having so wide plain faces often means problems, however, because the setting of the mill spindles varies in different machines.

The present invention provides a simple solution of the above-mentioned problems. The invention is characterized in that a supporting body, which takes up the stability and most of the mass, is fastened to the spindle nose or rotary axle of the of the mill and serves as a support for the usually shell-shaped milling cutter body which latter holds the cutting inserts per se.

The invention will be better understood from a consideration of the following description, taken in conjunction with the accompanying drawing, in which:

FIG. 1 shows a tool according to the invention;

FIG. 2 schematically shows the setting of milling cutter and mill spindle in a milling machine; and FIGS. 3–5 show different embodiments of the invention.

The tool shown in FIG. 1 consists essentially of a supporting body 1 and a milling cutter body 2. The supporting body is fastened to the spindle nose 3 of the milling machine by means of bolts or screws 4. It is provided with an annular plain surface 5 against which the milling cutter body 2 is supported. In the embodiment shown, the milling cutter body consists of an annular outer part 6 which forms the mentioned support and a disc-shaped central part 7. Furthermore, the milling cutter body has a guide or center pin 8 which projects into the support body and is held on the spindle of the milling machine by means of a center screw 9. A wedge 10 transmits drive from the supporting body to the milling cutter body. The proper milling cutter body 2 is also provided with suitable conventional fastening means (not shown) for a plurality of inserts 11 arranged about its periphery. The center screw 9 suitably can be fastened to a plate 13 which is mounted in a through hole 14 of supporting body 1.

Milling cutter body 2 can be formed without any demands upon its own stability in axial direction and, thus, can be very light. Axial cutting forces are taken up by the supporting body 1 via the supporting face 5. In radial direction good stability is obtained because the disc-shaped part 7 offers great rigidity at radial load even if it is made relatively thin. By means of center pin 8 adequate support and centering in the supporting body 1 are obtained. The cutting forces acting upon the inserts during the cutting operation are thus taken up in an effective way by the supporting body 1, and exceedingly small faults concerning axial displacement occur in the setting of the milling cutter because the annular supporting face 5 is on the same (or nearly the same) distance from the axis of rotation as are inserts 11. The supporting face 5 can, for example, be ground for fine adjustment after the supporting body has been mounted on the spindle nose meaning a very small axial change.

FIG. 2 illustrates that the milling machines, in order to avoid so-called dragging, are usually built so that the axis of rotation of the spindle deviates slightly from 90° in relation to the feed direction. It deals with values of the angle $\alpha$ usually smaller than 1 minute. The best result is obtained if the angle of the plain faces in relation to the plane of rotation, — the angle $\beta$ (see also FIG. 1), — is equal to the angle $\alpha$.

The invention opens quite new possibilities in the adjustment of the cutting inserts so that the plain faces carefully coincide with the feeding direction. By drawing screw 9, the disc-shaped part 7 of the milling cutter body is bent, and because the annular part 6 has small rigidity it follows this displacement in some degree. In this way the angle $\beta$ is changed. By different drawing of the screw 9, suitably limited by a spacer 12 or the like, the angle $\beta$ can thus be adjusted to desired values.

The figures show one embodiment of the invention but other embodiments may also exist within the scope of the invention. Thus, the proportions between annular part 6 and the disc-shaped part 7 may, for example, vary to such an extent that the whole milling cutter body consists of an essentially uniformly thick disc provided with fastening means for the cutting inserts on its periphery. Furthermore, the annular supporting face of the supporting body and/or the corresponding supporting face of the milling cutter body may, for example, be substituted by a number of plain faces or points which together give an annularly arranged support to the milling cutter body. In FIGS. 3–5, the extreme cases just mentioned are illustrated in which the milling cutter body consists of a fairly uniformly thick disc. The annular supporting face 5 may be formed either on the milling cutter body (FIG. 3) or on the supporting body (FIG. 4), or upon both these bodies (FIG. 5). In all embodiments shown it is essential that a gap 15 is formed between the milling cutter body and the supporting body so that the inward bending of the cutter body is made possible. Because of its small rigidity the milling cutter body functions nearest as a "large elastic washer" which can be simply adjusted by means of a force acting upon the central part of the body. In order to limit the movement of the last-mentioned part it is possible to use, besides spacers and the like, for example set screws 16, as shown in FIG. 5, or one may make the whole center part with threads.

Finally, it should be noted that the invented tool in function diverges essentially from the functioning of the known tool design in which the milling cutter is attached to the spindle nose of a milling machine by means of an intermediate part or adapter. In that case, the very milling cutter is of conventional type and usually has a diameter, — and particularly a thickness and mass, — much exceeding the same of the adapter body.

Support is essentially obtained along the whole contact surface between adapter and milling cutter.

I claim:

1. A face milling cutting tool for milling plane, milled surfaces on workpieces of metals and similar materials, said tool consisting essentially of a supporting body (1) adapted to be fastened to a spindle nose (3) or rotary axle of a milling machine, and a milling cutter body (2) provided with inflexible cutting inserts (11) arranged on its periphery, said milling cutter body (2) being supportable on an annular plane support surface (5) on the outer peripheral part (6) of said supporting body (1), said support surface having approximately the same extension as that of said cutter body and taking up axial cutting forces, said milling cutter body (2) being essentially disk- or shell-shaped and attached to the supporting body (1) in the central part of the cutting tool by holding means (9, 13) arranged for fastening and bending the milling cutter body (2), whereby to compensate for any small deviation of the axis of rotation of such splindle or axle and to tilt the cutting inserts (11).

2. Cutting tool according to the claim 1, wherein said holding means consist of a center screw (9), by drawing of which the milling cutter body is bent and the cutting inserts are somewhat turned or twisted in relation to a plane of rotation through the points of the inserts.

* * * * *

UNITED STATES PATENT OFFICE
CERTIFICATE OF CORRECTION

Patent No. 3,855,680      Dated December 24, 1974

Inventor(s) SVEN AXEL OLOF WIRFELT

It is certified that error appears in the above-identified patent and that said Letters Patent are hereby corrected as shown below:

Name of Applicant is misspelled:

WIREFELT should read WIRFELT

Signed and sealed this 11th day of February 1975.

(SEAL)
Attest:

RUTH C. MASON
Attesting Officer

C. MARSHALL DANN
Commissioner of Patents
and Trademarks